(12) United States Patent
Benakli et al.

(10) Patent No.: US 8,537,501 B2
(45) Date of Patent: Sep. 17, 2013

(54) WRITE HEAD WITH MODIFIED SIDE SHIELDS

(75) Inventors: Mourad Benakli, Bloomington, MN (US); Kirill Aleksandrovich Rivkin, Edina, MN (US); James Gary Wessel, Savage, MN (US); Dehua Han, Freemont, CA (US); Huaqing Yin, Eden Prairie, MN (US); Scott Franzen, Savage, MN (US); Jianhua Xue, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 59 days.

(21) Appl. No.: 13/072,890

(22) Filed: Mar. 28, 2011

(65) Prior Publication Data

US 2012/0250187 A1 Oct. 4, 2012

(51) Int. Cl.
*G11B 5/127* (2006.01)

(52) U.S. Cl.
USPC ........................................ 360/319; 360/125.3

(58) Field of Classification Search
USPC .................. 360/125.04, 125.06, 125.17, 319, 360/125.3
See application file for complete search history.

(56) References Cited

U.S. PATENT DOCUMENTS

| | | | |
|---|---|---|---|
| 6,801,409 B2 | 10/2004 | Michel | |
| 6,934,128 B2* | 8/2005 | Tsuchiya et al. | 360/317 |
| 7,102,854 B2 | 9/2006 | Wang | |
| 7,295,401 B2* | 11/2007 | Jayasekara et al. | 360/125.08 |
| 7,732,069 B1 | 6/2010 | Benakli | |
| 7,782,574 B1 | 8/2010 | Benakli | |
| 7,920,358 B2* | 4/2011 | Jiang et al. | 360/125.17 |
| 7,978,431 B2* | 7/2011 | Han et al. | 360/125.3 |
| 8,149,538 B2* | 4/2012 | Fuchizaki et al. | 360/125.3 |
| 2005/0068670 A1 | 3/2005 | Amin | |
| 2007/0121248 A1* | 5/2007 | Sasaki et al. | 360/126 |
| 2007/0242392 A1 | 10/2007 | Benakli | |
| 2009/0174968 A1 | 7/2009 | Singleton | |
| 2009/0262636 A1 | 10/2009 | Xue | |
| 2009/0284874 A1 | 11/2009 | Yin | |
| 2010/0232062 A1 | 9/2010 | Gao | |
| 2011/0007428 A1 | 1/2011 | Batra | |
| 2011/0075294 A1* | 3/2011 | Fuchizaki et al. | 360/123.12 |

* cited by examiner

*Primary Examiner* — Angel A. Castro
(74) *Attorney, Agent, or Firm* — Mueting Raasch & Gebhardt PA

(57) ABSTRACT

A write head, the write head having an air bearing surface, the write head including a magnetic write pole, wherein at the air bearing surface, the write pole has a trailing surface, a leading surface that is opposite the trailing surface, and first and second surfaces; a trailing shield proximate the trailing surface of the magnetic write pole; first and second gaps proximate the first and second surfaces of the magnetic write pole; first and second side shields proximate the first and second gaps, each of the first and second side shields having a trailing shield surface; and first and second antiferromagnetic-coupling layers positioned between the trailing shield surfaces of the first and second side shields and the trailing shield.

11 Claims, 4 Drawing Sheets

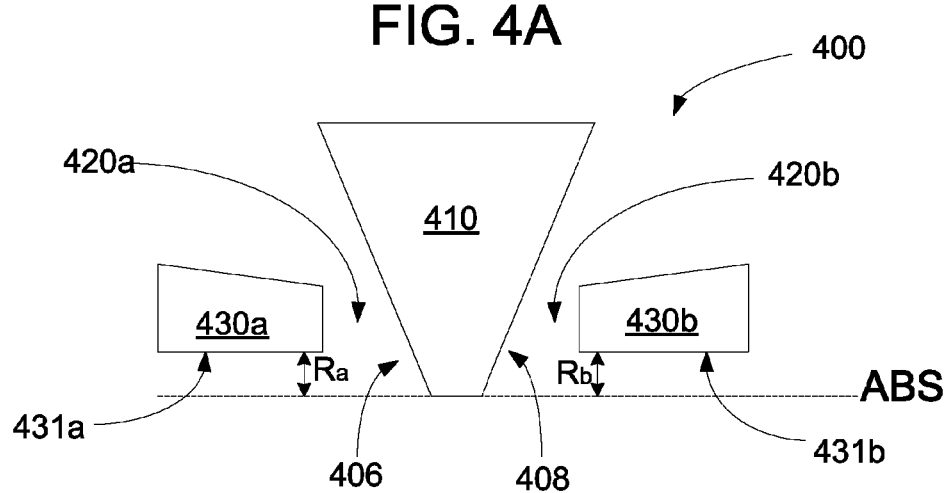
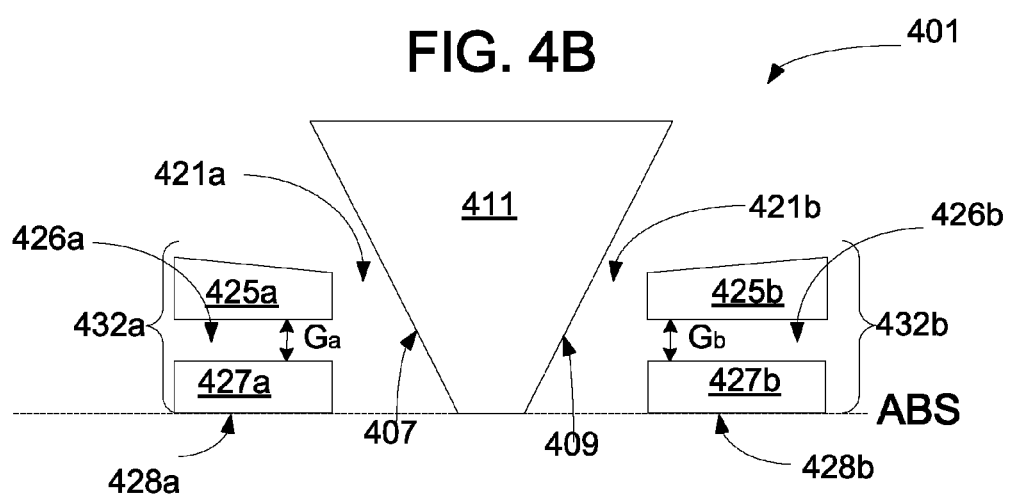

WRITE HEAD WITH MODIFIED SIDE SHIELDS

FIELD

This disclosure relates generally to write heads, and more specifically to write heads that include at least side shields.

BACKGROUND

Utilization of side shields in write heads can affect in cross-track gradients and therefore areal density. The use of side shields can however cause side track erasure (STE). STE can be caused by a number of phenomena including flux leakage through the flare angle into the side shields and into the media.

BRIEF DESCRIPTION OF THE DRAWINGS

FIGS. 4A and 4B are schematic views of a write head with recessed side shields according to an embodiment (FIG. 4A), and a write head with different magnetic portions in side shields according to an embodiment (FIG. 4B)

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed herein are apparatuses and devices, for example write heads. Generally, write heads may be utilized to write data, or bits (or bytes) to magnetic recording media. Write heads can also be part of a larger device that can include other components, for example a reader for reading the magnetic recording media. In embodiments, the larger device can be referred to as a slider. Write heads according to embodiments include modified side shields.

Herein the term "antiferromagnetic-coupling layer" or "antiferromagnetic-coupling layers" refers to a material or combination of materials that causes adjacent magnetic films to align their magnetizations antiparallel to each other. A nonexhaustive list of materials that can form an antiferromagnetic-coupling layer or antiferromagnetic coupling layers is: Ru, Cu, Pd, Cr, Au, Ag, and Mo.

Figure 1A:
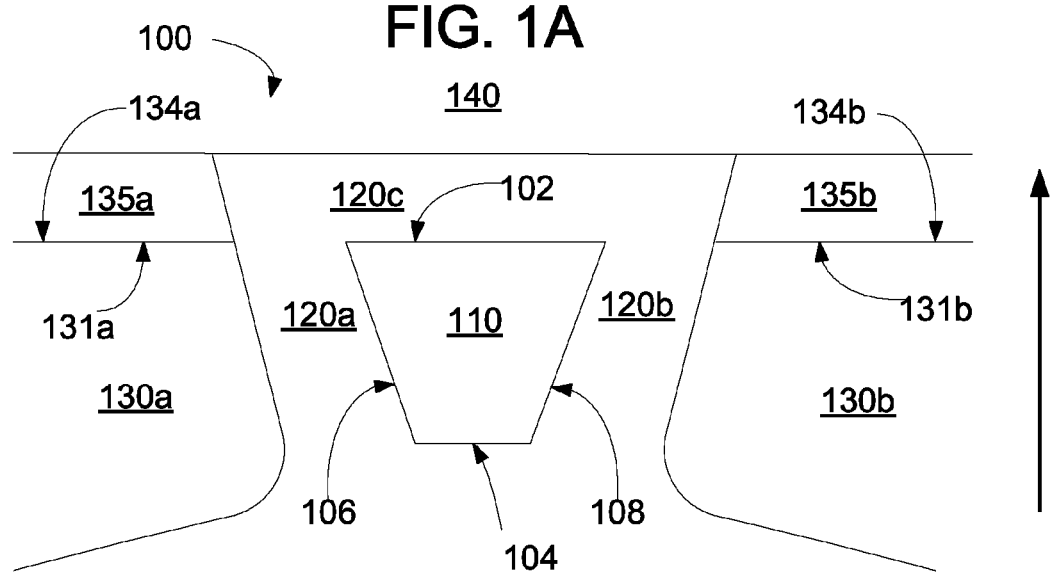
FIG. 1 is a schematic view of a write head according to an embodiment from the air bearing surface (ABS)

FIG. 1A schematically depicts a write head 100. The write head 100 is shown from the air bearing surface (ABS). This view can also be described as the view as seen from the magnetic recording media. A write head 100 may include a magnetic write pole 110. The write pole 110, along with other components (such as a write coil and a return pole which are not shown herein) may function to induce a magnetic field from the write pole that passes through at least a portion of a magnetic recording medium and back to the return pole. Although not required, the write pole 110 may have a trapezoidal shape as depicted in FIG. 1A.

The write pole 110 has four sides. The four sides (or edges) or surfaces of the write pole 110 can generally be identified based on the direction which the magnetic recording media moves past the write pole when in use. The usual direction of movement of the magnetic recording media with respect to the write head is shown by the arrow in FIG. 1A. Based on this direction of movement, the write pole has a leading surface 104, which is the first to reach the magnetic recording media and a trailing surface 102, which is directly opposed to the leading surface 104. The write pole 110 also has a first surface 106 and a second surface 108 which are generally the third and fourth surfaces of the write pole 110.

Proximate (or adjacent or directly adjacent) to the write pole 110 on the trailing surface 102 is a trailing gap 120c. The trailing gap 120c can be made of non-magnetic materials. Proximate (or adjacent or directly adjacent) to the trailing gap 120c is a trailing shield 140. The trailing shield 140 may be made of magnetic materials. In embodiments, the trailing shield 140 may be made of soft ferromagnetic materials including, for example, alloys of NiFe, CoFe, and NiFeCo.

Proximate (or adjacent or directly adjacent) to the write pole 110 on the first and second surfaces 106 and 108 are first and second side gaps 120a and 120b. The first and second side gaps 120a and 120b can be made of non-magnetic material. Proximate (or adjacent or directly adjacent) to the first and second side gaps 120a and 120b are first and second side shields 130a and 130b (which can also be referred to collectively as "the side shields"). The first and second side shields 130a and 130b may be made of magnetic materials. In embodiments, the first and second side shields 130a and 130b may be made of soft ferromagnetic materials including, for example, alloys of NiFe, CoFe, and NiFeCo. The first and second side shields 130a and 130b have trailing shield surfaces 131a and 131b. The trailing shield surfaces 131a and 131b are the surfaces of the first and second side shields 130a and 130b that are most proximate to or closest to the trailing shield 140.

Write head 100 also includes first and second antiferromagnetic-coupling layers 135a and 135b. It should be noted that first and second antiferromagnetic-coupling layers 135a and 135b can also be considered a single layer of material in that the write pole 110 and the gaps simply interrupt this single layer. The first and second antiferromagnetic-coupling layers 135a and 135b (which can also be referred to collectively as "the antiferromagnetic-coupling layers" or "antiferromagnetic coupling layer") are positioned between the trailing shield 140 and the trailing shield surfaces 131a and 131b of the side shields 130a and 103b. In embodiments, the position of the antiferromagnetic-coupling layers can be more specifically identified. As seen in FIG. 1A, the first and second antiferromagnetic-coupling layers 135a and 135b can be described as having bottom surfaces 134a and 134b. In embodiments, the bottom surfaces 134a and 134b of the antiferromagnetic-coupling layers 135a and 135b can be in substantially the same plane (as used herein, "substantially the same plane" can mean that the two surfaces are within ±5 nm of each other) as the trailing surface 102 of the magnetic write pole 110. In embodiments, the bottom surfaces 134a and 134b of the antiferromagnetic-coupling layers 135a and 135b can be in the same plane as the trailing surface 102 of the magnetic write pole 110. Embodiments where the bottom surfaces of the antiferromagnetic-coupling layers are at least substantially in the same plane as the trailing surface of the write pole can provide advantageous levels of erasure fields and field uniformity.

The number of individual layers that can make up an antiferromagnetic-coupling layer can depend at least in part on pre-determined properties of the side shields. Overall, increasing the number of individual layers may decrease both the erasure and the shielding effect. The position of an antiferromagnetic-coupling layer can also be determined to provide various effects. The number of individual layers making up an antiferromagnetic-coupling layer, the position of the antiferromagnetic-coupling layer and other similar performance parameters can be determined based on a number of factors, including for example, pre-determined reductions in erasure fields and improvements in cross-track gradients which can be antagonistic.

In embodiments, the trailing shield 140 can be adjacent to (or directly adjacent to or in physical contact with) the first and second antiferromagnetic-coupling layers 135a and 135b. In embodiments, the first and second antiferromagnetic-coupling layers 135a and 135b can be adjacent to (or directly adjacent to or in physical contact with) the first and second side shields 130a and 130b. In embodiments, the trailing shield 140 can be adjacent to (or directly adjacent to or in physical contact with) the first and second antiferromagnetic-coupling layers 135a and 135b; and the first and second antiferromagnetic-coupling layers 135a and 135b can be adjacent to (or directly adjacent to or in physical contact with) the first and second side shields 130a and 130b.

In such an embodiment, the trailing shield, the antiferromagnetic-coupling layers, and the side shields can constitute a single body that is made up of different materials. The different materials can be deposited in stepwise fashion or can be deposited separately and put together after deposition, for example. The trailing shield 140, antiferromagnetic-coupling layers 135a and 135b, and first and second side shields 130a and 130b may also include other layers.

The antiferromagnetic-coupling layers may be made of any antiferromagnetic-coupling material or more than one type of antiferromagnetic-coupling material. In embodiments, the antiferromagnetic-coupling material can have an exchange coupling constant of at least about 0.1 erg/cm$^2$, for example.

In embodiments, the first antiferromagnetic-coupling layer can be made of a different material than the second antiferromagnetic-coupling layer. Types of materials that may be used can include, for example Ru, Cr, Pd, Cu, Au, Ag, and Mo. Specific types of materials that may be used in the antiferromagnetic-coupling layers can include, for example, Ru or Cr. In embodiments, the antiferromagnetic-coupling layers can include Ru.

Figure 2A:
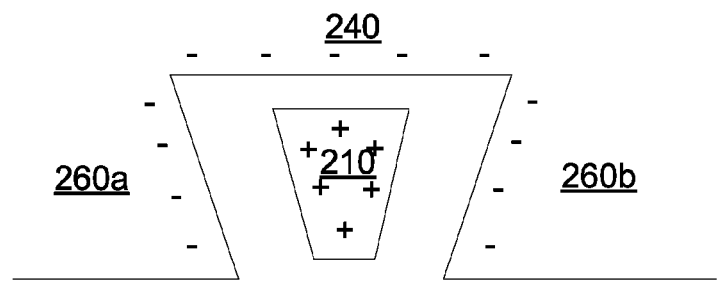
FIGS. 2A to 2D are schematic views of polarities of a write head that does not include an antiferromagnetic-coupling layer (FIG. 2A) both in the static case (FIG. 2B) and during an erasure event (FIG. 2D), and a schematic view of polarities of a write head that does include an antiferromagnetic-coupling layer according to an embodiment (FIG. 2C)
Figure 2B:
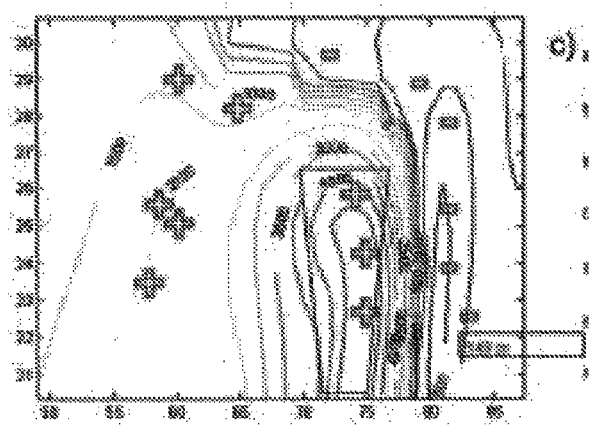

Without utilizing write heads as disclosed herein, the steady state situation of write poles may not be effectively addressed. Because the write pole and the shields are both magnetic, charges of opposite polarity can be induced in the shields (both trailing shield and side shields) by the write pole. This is schematically depicted in FIG. 2A. For example, the write pole 210 can be positively charged and the shields (trailing shield 240, first side shield 260a and second side shield 260b) can be negatively charged. When both the trailing shield and the side shields are negatively charged (or both positively charged), crosstrack and downtrack gradients can be enabled. Dynamic erasure fields that correspond to the generation of transient charges in the side shields of the same polarity as the write pole, that can be induced by such a situation can be seen in FIG. 2B.

Figure 2C:
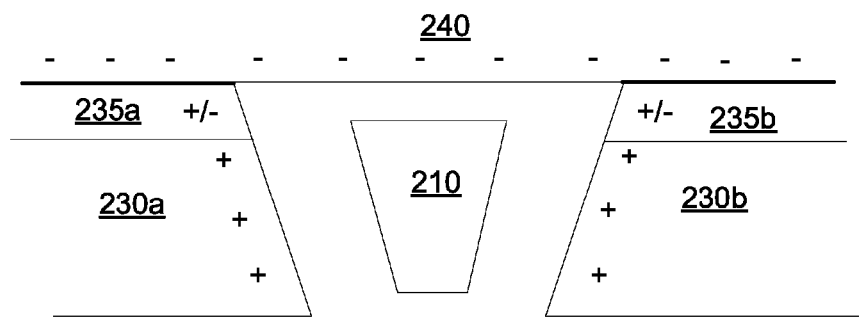

In embodiments that include antiferromagnetic-coupling layers, the opposite charges, created by the leakage from the write pole and the undershoot, created by the flux path from the write pole into the soft underlayer and into the side shields, appear in close proximity to each other, on the opposite sides of the antiferromagnetic-coupling layer (i.e., in first antiferromagnetic-coupling layer 235a and second antiferromagnetic-coupling layer 235b). This may prevent or minimize the same polarity (as the write pole) charges from spreading into the trailing shield, as seen in FIG. 2C, which could significantly affect the writer performance by reducing the downtrack gradient. This may also reduce (in some embodiments significantly) the erasure field generated in the media plane. This reduction may take place even though the density of the same polarity charges remains significant, because they are now in a close proximity to the charges of the opposite polarity, as seen in FIG. 2C.

Figure 2D:
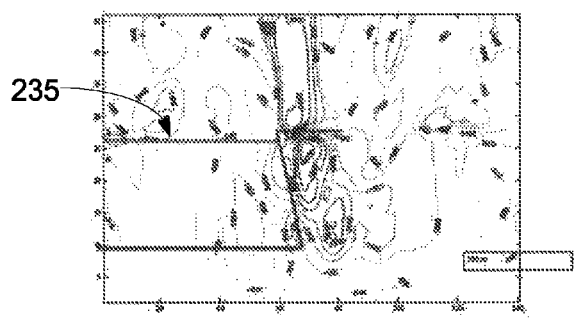

Dynamic erasure fields that can be induced by such a situation can be seen in FIG. 2D. As seen in FIG. 2D, inclusion of a single antiferromagnetic-coupling layer 235 can significantly reduce the maximum erasure fields (to 1000+Oe (FIG. 2D) from 3-4 KOe in FIG. 2B).

Figure 3:
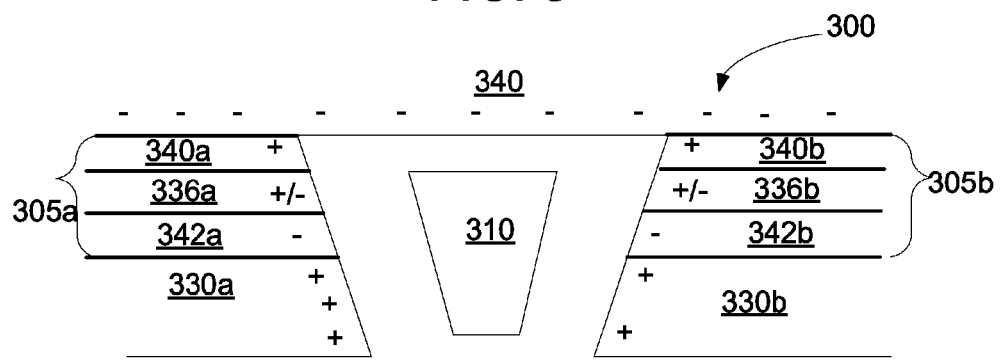
FIG. 3 is a schematic view of a write head that includes a layered structure according to an embodiment from the ABS showing the polarities.

Write heads can also optionally include stacks. A write head 300 that includes optional first and second layered structures (the first and second layered structures can also be referred to herein as "the layered structures") is depicted in FIG. 3. In embodiments that include optional layered structures 305a and 305b, the first and second antiferromagnetic-coupling layers 336a and 336b can be disposed within the first and second layered structures 305a and 305b respectively. The layered structures 305a and 305b may also include upper and lower magnetic layers. In the embodiment depicted in FIG. 3, the first layered structure 305a includes an upper magnetic layer 340a and a lower magnetic layer 342a, which sandwich the first antiferromagnetic-coupling layer 336a. This can also be described as the first antiferromagnetic-coupling layer 336a being positioned between the upper magnetic layer 340a and the lower magnetic layer 342a. The second layered structure 305b may have a similar structure, with similarly positioned layers. The optional layered structures may be positioned between the trailing surfaces of the first and second side shields and the trailing shield.

The antiferromagnetic-coupling layers that are positioned in the optional layered structures can be made of the same materials as the antiferromagnetic-coupling layers discussed above. The upper and lower magnetic layers may be made of magnetic materials that are more magnetic than the materials of the side shields. In embodiments, the upper and lower magnetic layers may be made of the same or different materials. In embodiments, the upper and lower magnetic layers may be made of materials that have a magnetic flux density of from 0.5 Tesla (T) to 2.4 T. In embodiments, the upper and lower magnetic layers may be made of materials that have a magnetic flux density of about 2.4 T.

In embodiments that include layered structures such as those depicted in FIG. 3, the antiferromagnetic-coupling layer can be positioned in a similar fashion to that of the antiferromagnetic-coupling layer in the embodiment depicted in FIG. 2D, or can be positioned differently. In embodiments, an antiferromagnetic-coupling layer in a layered structure can be positioned between the trailing shield 340 and the trailing shield surfaces of the side shields 330a and 330b. In embodiments, the position of the antiferromagnetic-coupling layer in layered structures can be more specifically identified. For example, the top surfaces (the surfaces adjacent to the upper magnetic layers 340a and 340b) of the first and second antiferromagnetic-coupling layers 336a and 336b can be in substantially the same plane as the trailing surface of the magnetic write pole 310. In embodiments, the top surfaces (the surfaces adjacent to the upper magnetic layers 340a and 340b) of the first and second antiferromagnetic-coupling layers 336a and 336b can be in the same plane as the trailing surface of the magnetic write pole 310.

Embodiments that include optional layered structures can function to further improve the antiferromagnetic coupling of the antiferromagnetic-coupling layer to the side shields and trailing shield. An example of how that can take place can be seen in FIG. 3. As seen in FIG. 3, the upper 340a (and 340b) and lower 342a (and 342b) magnetic layers function along with the antiferromagnetic-coupling layers 336a (and 336b) to enforce the opposite polarity of the side shield 330a (and 330b) and the trailing shield 340.

Another example of a write head includes the write head 400 depicted in FIG. 4A. The write head 400 has an air bearing surface (ABS) and includes a magnetic write pole 410. The write pole 410 has a first surface 406 and an opposing second surface 408. Proximate (or adjacent or directly adjacent) to the write pole 410 on the first and second surfaces 406 and 408 are first and second side gaps 420a and 420b. The first and second side gaps 420a and 420b can be made of non-magnetic material. Proximate (or adjacent or directly adjacent) to the first and second side gaps 420a and 420b are first and second side shields 430a and 430b (which can also be referred to collectively as "the side shields"). The first and second side shields 430a and 430b may be made of magnetic materials. In embodiments, the first and second side shields 430a and 430b may be made of soft ferromagnetic materials including, for example alloys of NiFe, CoFe, and NiFeCo. The first and second side shields 430a and 430b have lower surfaces 431a and 431b. The lower surfaces 431a and 431b are the surfaces of the first and second side shields 430a and 430b that are most proximate to or closest to the ABS.

Although the lower surfaces 431a and 431b are the surfaces of the side shields that are closest to the ABS, they are located above the ABS. By above, it is meant that the lower surfaces of the first and second side shields 430a and 430b are not substantially planar with the ABS, but are instead located farther from the magnetic media (when the write head 400 is located with respect to magnetic media for purposes of writing to the media) than the ABS is located from the magnetic media. This can also be stated as the lower surfaces of the first and second side shields 430a and 430b being more recessed from the ABS than the write pole 410 is located.

In embodiments, the lower surfaces 431a and 431b can be located a recess distance, R above the ABS. The recess distance, $R_a$, of the lower surface 431a of the first side shield 430a and the recess distance, $R_b$, of the lower surface 431b of the second side shield 430b are both shown in FIG. 4A. In embodiments, the recess distances, $R_a$ and $R_b$, can be the same or different. In embodiments, the recess distances can be from 10 nm to 70 nm. In embodiments, the recess distances can be from 20 nm to 60 nm. In embodiments, the recess distances can be from 35 nm to 45 nm. In embodiments, the recess distances can be 40 nm.

Erasure events may occur when the charges in the side shields are concentrated in a small area, creating large flux densities in the media. If the side shields are recessed, such as the embodiments described herein, the created flux density due to localized charges can be decreased (in embodiments significantly decreased). If the fact that large concentrations of charges of one polarity always results in generation of charges of the opposite polarity is also considered, then at a distance, such charges of opposite polarities may effectively screen each other. This can further reduce the field experienced by the media when side shields are recessed as described herein.

Write heads having recessed side shields can function to reduce erasure because the magnetic field from the side shields decreases as the distance away from the side shield increases. Therefore, if the side shield is located farther away from the media, the field strength at the level of the medium caused by the side shields will not be high enough to cause erasure.

Another example of a write head includes a write head 401 depicted in FIG. 4B. The write head 401 has an air bearing surface (ABS) and includes a magnetic write pole 411. The write pole 411 has a first surface 407 and an opposing second surface 409. Proximate (or adjacent or directly adjacent) to the write pole 411 on the first and second surfaces 407 and 409 are first and second side gaps 421a and 421b. The first and second side gaps 421a and 421b can be made of non-magnetic material. Proximate (or adjacent or directly adjacent) to the first and second side gaps 421a and 421b are first and second side shields 432a and 432b (which can also be referred to collectively as "the side shields").

The side shields can include at least a high magnetic material portion and a low magnetic material portion. This is illustrated for the first side shield 432a that includes a high magnetic material portion 425a and a low magnetic material portion 427a. The low magnetic material portions 427a and 427b can be further described as having lower surfaces 428a and 428b respectively. The low magnetic material potion 427a is proximate to (adjacent to or directly adjacent to) the ABS. In embodiments, the lower surfaces 428a and 428b of the low magnetic material portion 427a and 427b can be substantially planar with the air bearing surface ABS (as used herein, "substantially planar" can mean that the three surfaces are within ±5 nm of each other).

In embodiments, the high magnetic portions 425a and 425b can be separated from the low magnetic portions 427a and 427b by gaps 426a and 426b. The gaps 426a and 426b can be made of non-magnetic material, for example. The gap can be made of non-magnetic materials including, for example AlO, FeO, SiO, and AlN. The gaps can be described by their heights. The height of the first gap, $G_a$, and the height of the second gap, $G_b$ are both shown in FIG. 4B. In embodiments, the heights of the gaps, $G_a$ and $G_b$, can be the same or different. In embodiments, the heights of the gaps can be from 10 nm to 70 nm. In embodiments, the heights of the gaps can be from 20 nm to 60 nm. In embodiments, the heights of the gaps can be from 35 nm to 45 nm. In embodiments, the heights of the gaps can be 40 nm.

Materials of the high magnetic portion are more strongly magnetic than materials of the low magnetic portion. In embodiments, the low magnetic portion may be made of materials that have a magnetic flux density from 0.1 T to 0.9 T. In embodiments, the low magnetic portion may be made of materials that have a magnetic flux density from 0.3 T to 0.7 T. In embodiments, the low magnetic portion may be made of materials that have a magnetic flux density from 0.4 T to 0.6 T. In embodiments, the low magnetic portion may be made of materials that have a magnetic flux density of 0.5 T. In embodiments, the high magnetic portion may be made of materials that have a magnetic flux density from 1.1 T to 2.4 T. In embodiments, the high magnetic portion may be made of materials that have a magnetic flux density from 1.3 T to 1.7 T. In embodiments, the high magnetic portion may be made of materials that have a magnetic flux density from 1.4 T to 1.6 T. In embodiments, the high magnetic portion may be made of materials that have a magnetic flux density of 1.5 T. Specific materials for the low magnetic portion may include, for example FeCo, FeNiCo, Ni, NiCo, and NiFe. Specific materials for the high magnetic portion may include, for example FeCo, FeNiCo, Ni, NiCo, and NiFe. Specific materials for the low magnetic portion may include, for example NiFe, FeCo, and FeNiCo. Specific materials for the high magnetic portion may include, for example FeNiCo.

The low magnetic portion and the high magnetic portion can have the same or different thicknesses. In embodiments, the low magnetic portion and the high magnetic portion can independently have thicknesses of from 60 nm to 140 nm. In embodiments, the low magnetic portion and the high magnetic portion can independently have thicknesses of from 80 nm to 120 nm. In embodiments, the low magnetic portion and the high magnetic portion can independently have thicknesses of from 90 nm to 110 nm. In embodiments, the low magnetic portion and the high magnetic portion can independently have thicknesses of about 100 nm.

While recessed side shields (exemplified in FIG. 4A) can have low erasure fields, their effectiveness in establishing a flux closure from the write pole into the soft underlayer and into the side shields can often be somewhat reduced. This disadvantage can be compensated for by introducing a multilayer structure (exemplified in FIG. 4B), where recessing the shields from the ABS layer is accompanied by a layer with a much lower magnetic moment, located at the ABS.

Write heads having shields that include a low magnetic portion and a high magnetic portion can function to reduce erasure because the magnetic field from the low magnetic portion (while closer to the magnetic media), may not be strong enough to cause erasure, but strong enough to establish a strong undershoot, and therefore good crosstrack gradients. The upper magnetic layer may also effectively screen and dissipate magnetic leakage fields from the write pole.

Figure 5:
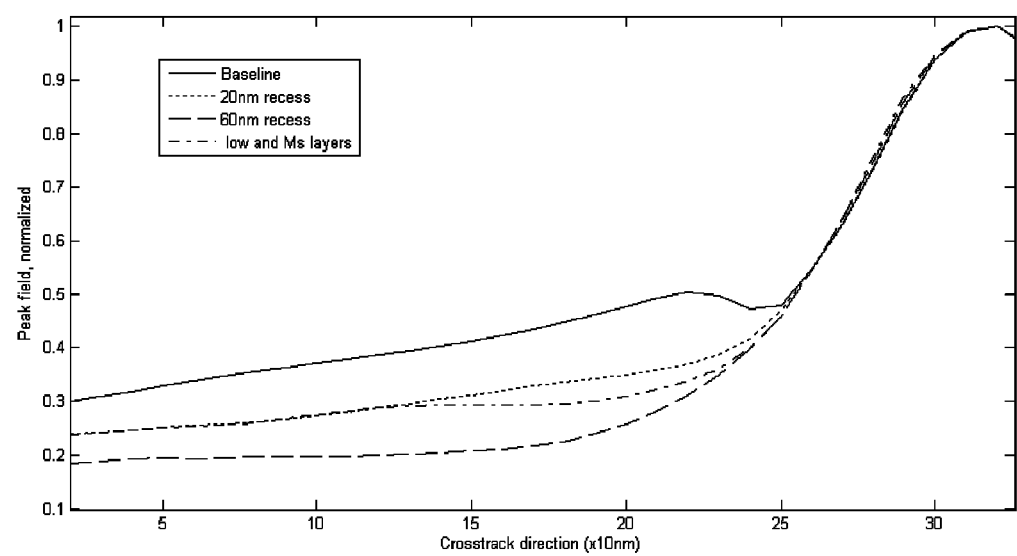
FIG. 5 is a graph showing the modified peak field versus the cross track coordinates for write heads according to embodiments and comparative write heads.

FIG. 5 shows the results of modeling the modified peak field (normalized) as a function of cross-track coordinates for a write head with a conventionally designed side shields (60 nm gap between side shields and the write pole, 2 T side shield material), side shields that have a recess distance of 20 and 60 nm (dotted and dashed line) and side shields that have a 0.5 T 60 nm thick low magnetic portion and a 2 T 60 nm thick high magnetic portion with a gap distance of 40 nm (dot-dash line).

Thus, embodiments of WRITE HEADS WITH MODIFIED SIDE SHIELDS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A write head, the write head having an air bearing surface, the write head comprising:
   a magnetic write pole, wherein at the air bearing surface, the write pole has a trailing surface, a leading surface that is opposite the trailing surface, and first and second surfaces;
   a trailing shield proximate the trailing surface of the magnetic write pole;
   first and second gaps proximate the first and second surfaces of the magnetic write pole;
   first and second side shields proximate the first and second gaps, each of the first and second side shields having a trailing shield surface; and
   first and second antiferromagnetic-coupling layers positioned between the trailing shield surfaces of the first and second side shields and the trailing shield, wherein the antiferromagnetic-coupling layers comprise an antiferromagnetic-coupling material having an exchange coupling constant of at least about 0.1 erg/cm$^2$.

2. The write head according to claim 1, wherein the antiferromagnetic-coupling layers comprise Ru, Cr, Pd, Cu, Au, Ag, or Mo.

3. The write head according to claim 1, wherein the antiferromagnetic-coupling layers comprise Ru.

4. The write head according to claim 1, wherein the bottom surface of the antiferromagnetic-coupling layers are in substantially the same plane as the trailing surface of the magnetic write pole.

5. The write head according to claim 1, wherein the bottom surface of the antiferromagnetic-coupling layers are in the same plane as the trailing surface of the magnetic write pole.

6. The write head according to claim 1, wherein the trailing shield physically contacts the first and second antiferromagnetic-coupling layers and the first and second antiferromagnetic-coupling layers physically contact the first and second side shields respectively.

7. The write head according to claim 1, wherein each of the first and second antiferromagnetic-coupling layers are disposed in first and second layered structures, wherein each of the first and second layered structures further comprise upper and lower magnetic layers, and wherein the antiferromagnetic-coupling layer is positioned between the upper and lower magnetic layers.

8. The write head according to claim 7, wherein the first and second layered structures are positioned between the trailing surfaces of the first and second side shields and the trailing shield.

9. The write head according to claim 7, wherein the upper and lower magnetic layers comprise a material having a magnetic field of from about 0.5 to 2.4 Tesla.

10. The write head according to claim 7, wherein the upper and lower magnetic layers comprise a material having a magnetic field of about 2.4 Tesla.

11. The write head according to claim 1, wherein the anti-ferromagnetic-coupling layer comprises a material that has an exchange coupling constant of at least about 0.1 erg/cm.

* * * * *